US007812813B2

(12) United States Patent
Cato

(10) Patent No.: US 7,812,813 B2

(45) Date of Patent: Oct. 12, 2010

(54) EPAPER STAMP

(75) Inventor: Robert Thomas Cato, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 1035 days.

(21) Appl. No.: 11/548,874

(22) Filed: Oct. 12, 2006

(65) Prior Publication Data

US 2008/0088576 A1 Apr. 17, 2008

(51) Int. Cl.

*G09G 3/34* (2006.01)
*G01D 15/06* (2006.01)
*G03G 15/00* (2006.01)

(52) U.S. Cl. ....................... 345/107; 347/111; 347/106; 101/2; 359/296; 359/245; 430/37; 430/311; 430/329

(58) Field of Classification Search .................. 345/173
See application file for complete search history.

(56) References Cited

U.S. PATENT DOCUMENTS 5,389,945 A * 2/1995 Sheridon ..................... 345/85
5,708,525 A * 1/1998 Sheridon ..................... 345/107
5,739,801 A * 4/1998 Sheridon ..................... 345/84
5,751,268 A * 5/1998 Sheridon ..................... 345/107
5,767,826 A * 6/1998 Sheridon et al. .............. 345/84
6,333,754 B1 * 12/2001 Oba et al. .................... 347/112
6,670,981 B1 * 12/2003 Vincent et al. .............. 347/264
6,738,050 B2 5/2004 Comiskey et al.
2002/0141801 A1 * 10/2002 Shimoda et al. ............... 400/76
2004/0041785 A1 * 3/2004 Stevens et al. .............. 345/107
2005/0237203 A1 10/2005 Burman et al.
2005/0237204 A1 10/2005 Burman et al.
2006/0049248 A1 3/2006 Becker et al.
2006/0133670 A1 * 6/2006 Barrus et al. ................ 382/173
2006/0161977 A1 * 7/2006 Jung et al. .................... 726/21
2007/0283248 A1 * 12/2007 Yoshida ...................... 715/526

FOREIGN PATENT DOCUMENTS

EP 1617397 A2 * 1/2006
EP 1617397 A2 8/2006
JP 2001270145 A * 10/2001

OTHER PUBLICATIONS

"History of the Printing Press", http://www.theoldprintingshop.com/history/, downloaded Dec. 2, 2009.*
"Fascinating facts about the Guetenberg Printing Press", http://www.ideafinder.com/history/inventions/printpress.htm#How It Works:, downloaded Dec. 2, 2009.*

* cited by examiner

*Primary Examiner*—Richard Hjerpe
*Assistant Examiner*—Dorothy Webb
(74) *Attorney, Agent, or Firm*—Yee & Associates, P.C.; Jason O. Piche

(57) ABSTRACT

A method and apparatus are provided for stamping a piece of ePaper. A grid is positioned within a selected distance to a first side of the piece of ePaper. A grounding pin conductively connects a conductive backing plate located on a second side of the piece of ePaper. The grounding pin completes a voltage path from the grid through the piece of ePaper to the conductive backing plate. A voltage is supplied to the grid and supplying the voltage to the grid changes the appearance of the piece of ePaper to form a stamped image.

15 Claims, 7 Drawing Sheets

EPAPER STAMP

BACKGROUND OF THE INVENTION

1. Field of the Invention

The present invention relates generally to ePaper and in particular to ePaper writing. Still more specifically, the present invention relates to a method and apparatus for writing ePaper using a stamp.

2. Description of the Related Art

Electronic reusable paper (ePaper) is a display material used to present information and has many of the properties of paper. Electronic reusable paper stores an image, is viewed in reflective light, has a wide viewing angle, is flexible, and is relatively inexpensive. Unlike conventional paper, however, it is electrically writeable and erasable. Although projected to cost somewhat more than a normal piece of paper, a sheet of electronic reusable paper could be re-used thousands of times. Electronic reusable paper has many potential applications in the field of information display including digital books, low-power portable displays, wall-sized displays, and fold-up displays.

Electronic reusable paper utilizes a display technology, invented at the Xerox® Palo Alto Research Center (PARC), called "Gyricon." A Gyricon sheet is a thin layer of transparent plastic in which millions of small beads, somewhat like toner particles, are randomly dispersed. The beads, each contained in an oil-filled cavity, are free to rotate within those cavities. The beads are "bichromal," with hemispheres of two contrasting colors, such as black and white, red and white, or blue and yellow, and charged so they exhibit an electrical dipole. When voltage is applied to the surface of the Gyricon sheet, the beads rotate to present one colored side to the viewer. Voltages can be applied to the surface of the Gyricon sheet to create images, such as text and pictures. The image will persist without a voltage applied for a significant period of time.

There are many ways an image can be created in electronic reusable paper. For example, Gyricon sheets can be fed into printer-like devices that will erase old images and create new images. Printer-like devices can be made so compact and inexpensive that one can imagine carrying one in a purse or briefcase at all times. One envisioned device, called a wand, could be pulled by hand across a sheet of electronic reusable paper to create an image. With a built-in input scanner, this wand becomes a hand operated multi-function device, such as a printer, copier, fax, and scanner. The wand device writes the image one line at a time.

For applications requiring more rapid and direct electronic updates, the Gyricon material might be packaged with a simple electrode structure on the surface and used more like a traditional display. An electronic reusable paper display could be very thin and flexible. A collection of these displays could be bound into an electronic book. With the appropriate electronics stored in the spine of the book, pages could be updated at will to display different content.

For portable applications, an active matrix array may be used to rapidly update a partial- or full-page display, much like what is used in today's portable devices. Gyricon displays do not require backlighting or constant refreshing and are brighter than today's reflective displays. These attributes will lead to Gyricon's utilization in lightweight and lower-power applications.

BRIEF SUMMARY OF THE INVENTION

The illustrative embodiments provide a method and apparatus for stamping a piece of ePaper. The illustrative embodiments position a grid within a selected distance to a first side of the piece of ePaper. The illustrative embodiments conductively connect a grounding pin to a conductive backing plate located on a second side of the piece of ePaper. The grounding pin completes a voltage path from the grid through the piece of ePaper to the conductive backing plate. The illustrative embodiments supply a voltage to the grid. Supplying the voltage to the grid changes the appearance of the piece of ePaper to form a stamped image.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
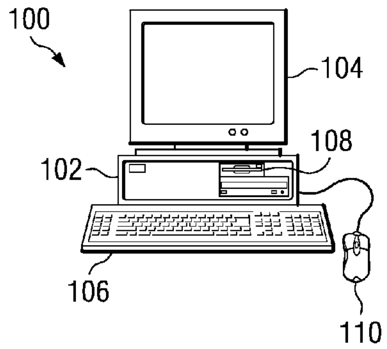
FIG. 1 shows a pictorial representation of a data processing system in which the illustrative embodiments may be implemented.

The illustrative embodiments provide for writing ePaper using a stamp. With reference now to the figures and in particular with reference to FIG. 1, a pictorial representation of a data processing system is shown in which the illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices (not shown) may include a joystick, touchpad, touch screen, trackball, microphone, and the like. The illustrative embodiments describe a stamping mechanism that is an input device.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Figure 2:
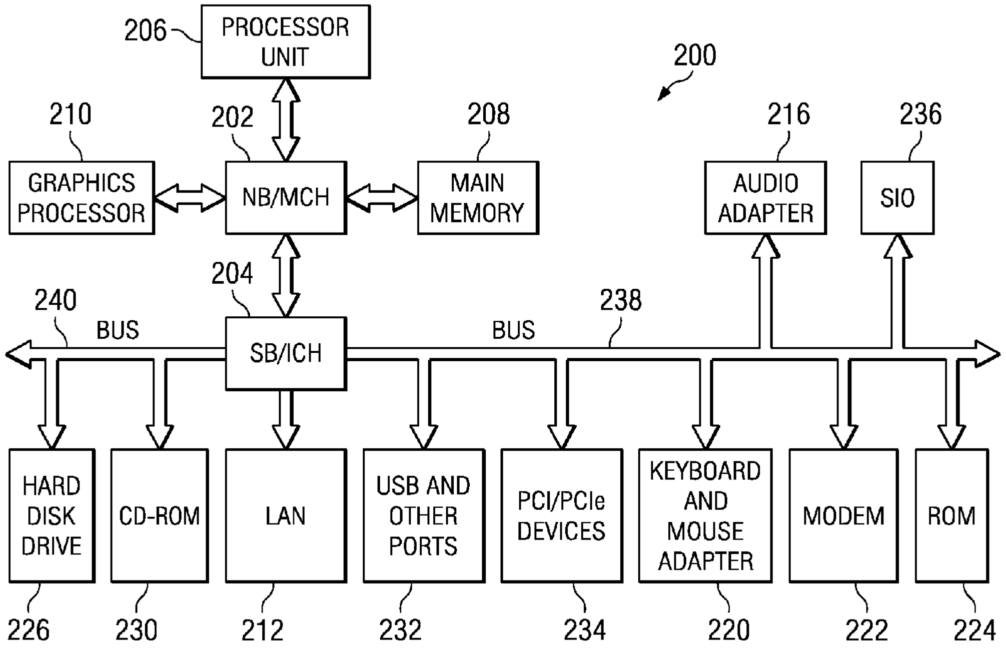
FIG. 2 depicts a block diagram of a data processing system in which the illustrative embodiments may be implemented.

Next, FIG. 2 depicts a block diagram of a data processing system in which the illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example. In the depicted example, local area network (LAN) adapter 212 is coupled to south bridge and I/O controller hub 204, audio adapter 216, keyboard and mouse adapter 220, modem 222, read only memory (ROM) 224, universal serial bus (USB) ports, and other communications ports 232. PCI/PCIe devices 234 are coupled to south bridge and I/O controller hub 204 through bus 238. Hard disk drive (HDD) 226 and CD-ROM drive 230 are coupled to south bridge and I/O controller hub 204 through bus 240. Some modern south bridge and I/O controller hubs, such as south bridge and I/O controller hub 204, may incorporate audio adapter 216, keyboard and mouse adapter 220, modem 222, and universal serial bus (USB) ports and other communications ports 232 internal on the chip.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204. Other devices that may be connected to PCI/PCIe devices 234, USB and other ports 232, or super I/O (SIO) device 236 may be devices that write to ePaper and confirm what has been written to ePaper. A device such as the stamping mechanism describe in the following illustrative embodiments may be controlled via a data processing system, such as processing unit 206.

An operating system runs on processing unit 206. This operating system coordinates and controls various components within data processing system 200 in FIG. 2. The operating system may be a commercially available operating system, such as Microsoft® Windows XP®. (Microsoft® and Windows XP® are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java-based trademarks are trademarks of Sun Microsystems, Inc. in the United States, other countries, or both.

Instructions for the operating system, the object-oriented programming system, and applications or programs are located on storage devices, such as hard disk drive 226. These instructions and may be loaded into main memory 208 for execution by processing unit 206. The processes of the illustrative embodiments may be performed by processing unit 206 using computer implemented instructions, which may be located in a memory. An example of a memory is main memory 208, read only memory 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, or telephone device.

Other components shown in FIG. 2 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in north bridge and memory controller hub 202. Also, a processing unit may include one or more processors or CPUs.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1 or data processing system 200 shown in FIG. 2.

The illustrative embodiments provide a hand-held or robotic mounted stamping mechanism for stamping a piece of ePaper. The stamping mechanism may stamp and re-stamp information onto the ePaper numerous times without deteriorating the ePaper. Both images and text may be stamped onto the ePaper.

The illustrative embodiments also provide for a video system that verifies the correct information was stamped onto the ePaper. The illustrative embodiments also provide for a video system that verifies the information that is already stamped onto the ePaper to enable determination if the information on the ePaper needs to be changed by stamping new information on the ePaper. The illustrative embodiments also provide for a video system that aligns the stamping mechanism so that the information is stamped in the correct location. The illustrative embodiments also provide for a video system that aligns the stamping mechanism for stamping a piece of ePaper multiple times when the ePaper is larger than the stamping mechanism and requires multiple stamps to reflect all required information.

Figure 3:
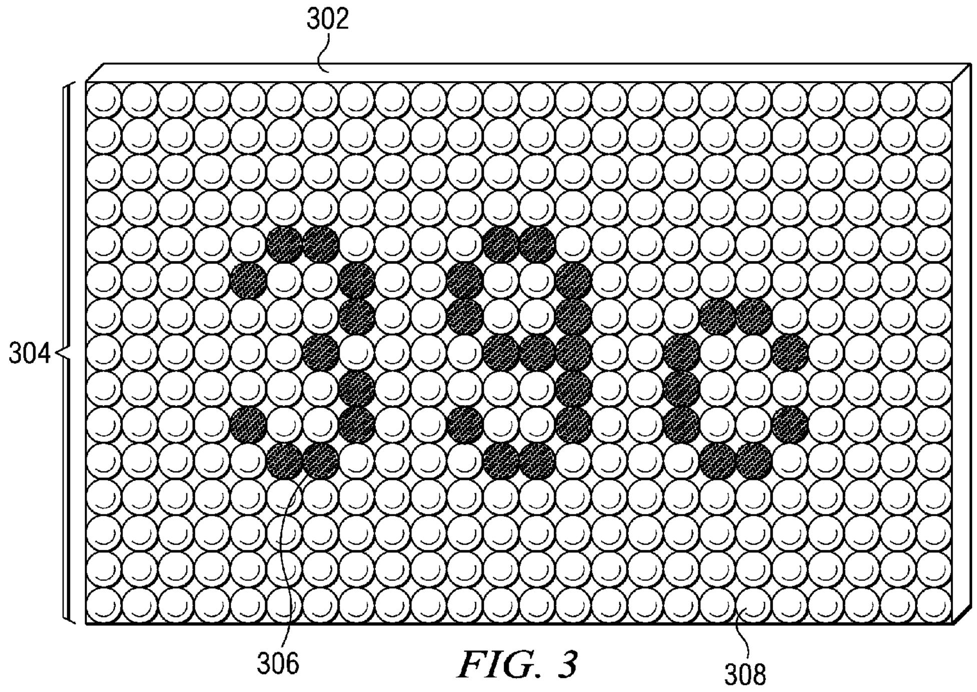
FIG. 3 depicts a piece of ePaper in accordance with an illustrative embodiment.

FIG. 3 depicts a piece of ePaper in accordance with an illustrative embodiment. ePaper 302 is a thin sheet of material in which millions of small beads 304, somewhat like toner particles, are dispersed. The beads may be dispersed randomly in the material or arranged in rows and columns or arranged in any desired pattern. The material may be transparent. The material may cover the beads, or the beads may be embedded into the material so their top surfaces are visible. Beads 304 may be each contained in an oil-filled cavity, and beads 304 are free to rotate within those cavities. Beads 304 are bichromal with hemispheres of two contrasting colors, such as bead 306 indicating a black color and bead 308 indicating a white color. Any set of contrasting colors may be used.

Beads 304 have an electric charge; therefore, beads 304 exhibit an electrical dipole. When an electric field (voltage) is applied across Paper 302, beads 304, within that electric field, rotate to present one colored side to the viewer. Voltages can be applied to ePaper 302 to create images, such as text and pictures. The image will persist on ePaper 302 for a substantial amount of time until new voltage patterns are applied.

Figure 4B:
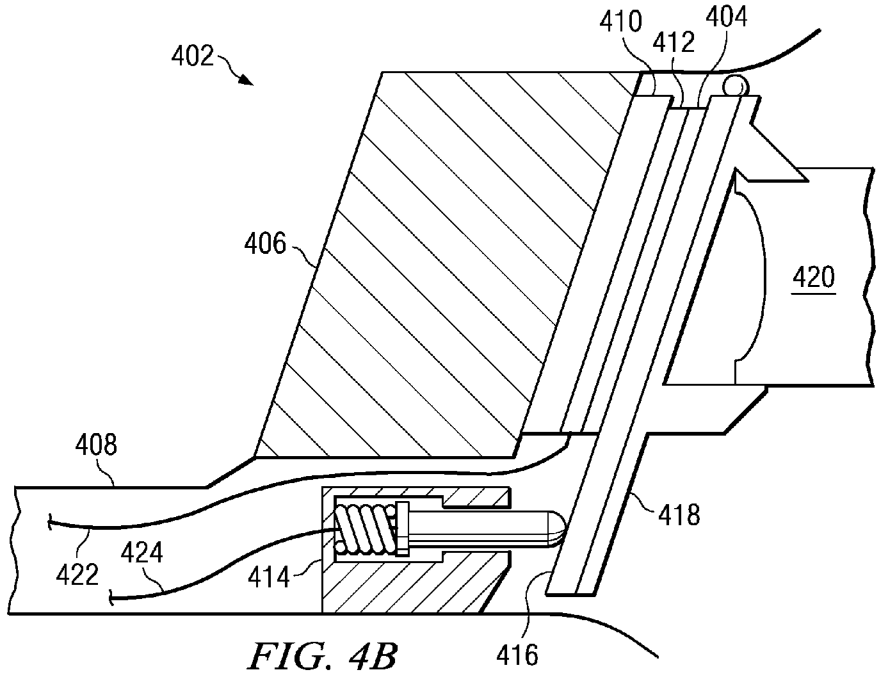
FIG. 4B illustrates the stamping of a piece of ePaper in accordance with an illustrative embodiment.
Figure 4A:
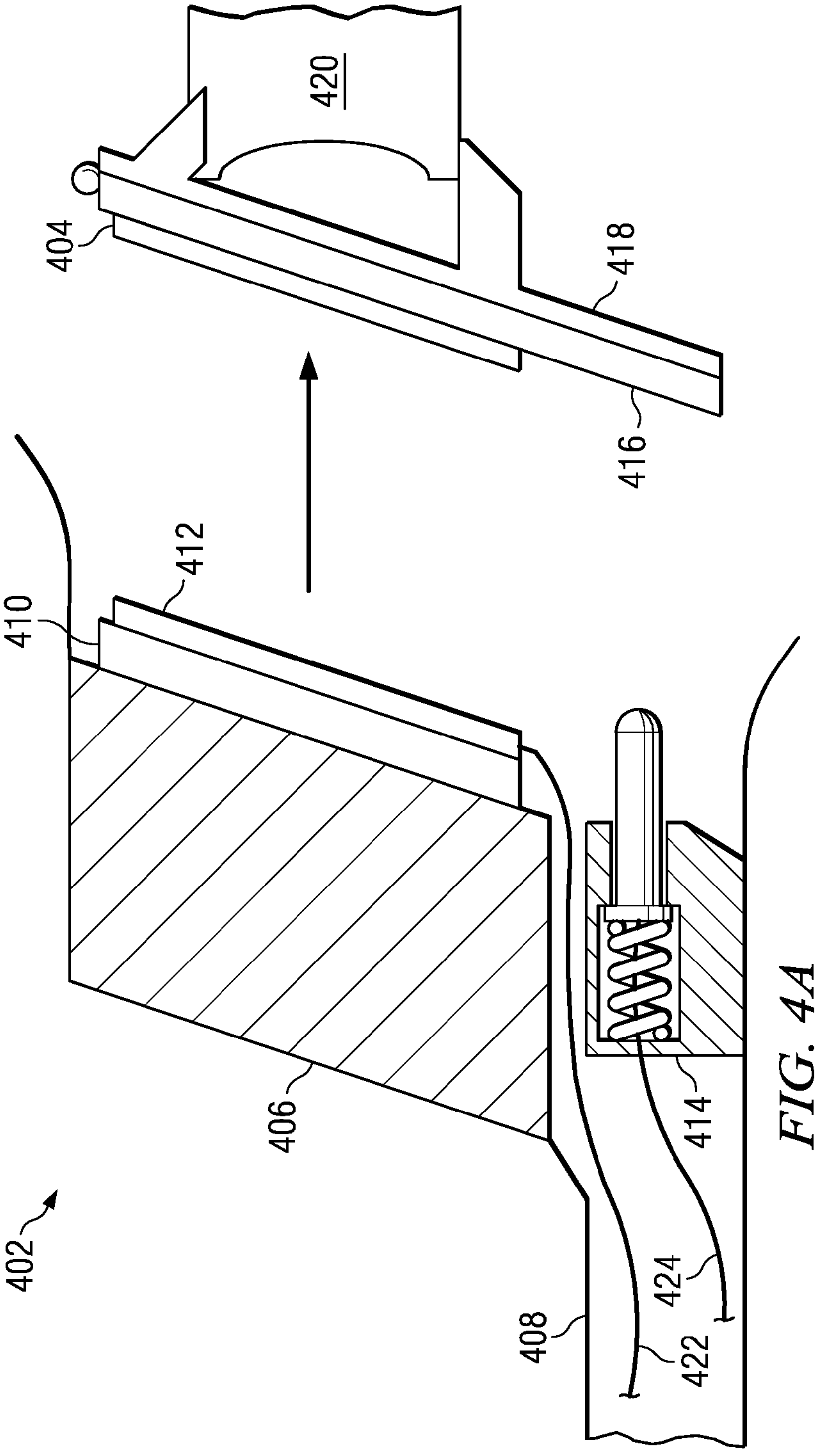
FIG. 4A illustrates the mechanisms required to stamp a piece of ePaper in accordance with an illustrative embodiment.

FIG. 4A illustrates the mechanisms required to stamp a piece of ePaper in accordance with an illustrative embodiment. The mechanism described in the following figures may be a device that accesses a data processing system, such as processing unit 206 of FIG. 2, via PCI/PCIe devices 234, USB and other ports 232, or super I/O (SIO) device 236 of FIG. 2. The mechanisms required to stamp a piece of ePaper are stamping mechanism 402, ePaper label 404, and metal backing plate 416. ePaper label 404 may be a piece of ePaper, such as ePaper 302 of FIG. 3. Stamping mechanism 402 comprises support structure 406 and handle 408. Handle 408 may be hand-held or mounted on a robot arm or other mechanism. Support structure 406 provides support to flexible backing 410 and grid 412. Flexible backing 410 provides flexibility to grid 412 when grid 412 is pressed against ePaper label 404. Grid 412 can be comprised of a thin film of mini-transistors which supplies the voltage or charge necessary to rotate the beads in ePaper label 404 to present one colored side for the beads in ePaper label 404. Stamping mechanism 402 can also comprise spring loaded ground pin 414 that completes the circuit necessary to write ePaper label 404.

ePaper label 404 may be affixed to metal backing plate 416. Metal backing plate 416 may be a metal plate or other conductive material that conducts electricity. Metal backing plate 416 may further be affixed to non-conductive ePaper mount 418, and non-conductive ePaper mount 418 may be further affixed to shelf 420 which may be a shelf in a retail store. Conductor 422 provides signals to the thin film of mini-transistors on grid 412. The signals may be from a processing unit, such as processing unit 206 of FIG. 2. Conductor 424 provides a grounding path to spring loaded ground pin 414. Other grounding methods, such as flexible electrically conductive foam, flexible metal "fingers", etc., may be used.

FIG. 4B illustrates the stamping of a piece of ePaper in accordance with an illustrative embodiment. Stamping mechanism 402 is shown to be within a selected distance of ePaper label 404. More specifically, grid 412 is within a selected distance of ePaper label 404, and spring loaded ground pin 414 is in contact with metal backing plate 416. At this point, signals received by grid 412 from conductor 422 are transmitted to ePaper label 404 which causes beads within ePaper label 404 to rotate to present one colored side. The signals may be from a processing unit, such as processing unit 206 of FIG. 2. The circuit is completed through ePaper label 404 to metal backing plate 416. Metal backing plate 416 is grounded through spring loaded ground pin 414, and the circuit completes through conductor 424.

Figure 5A:
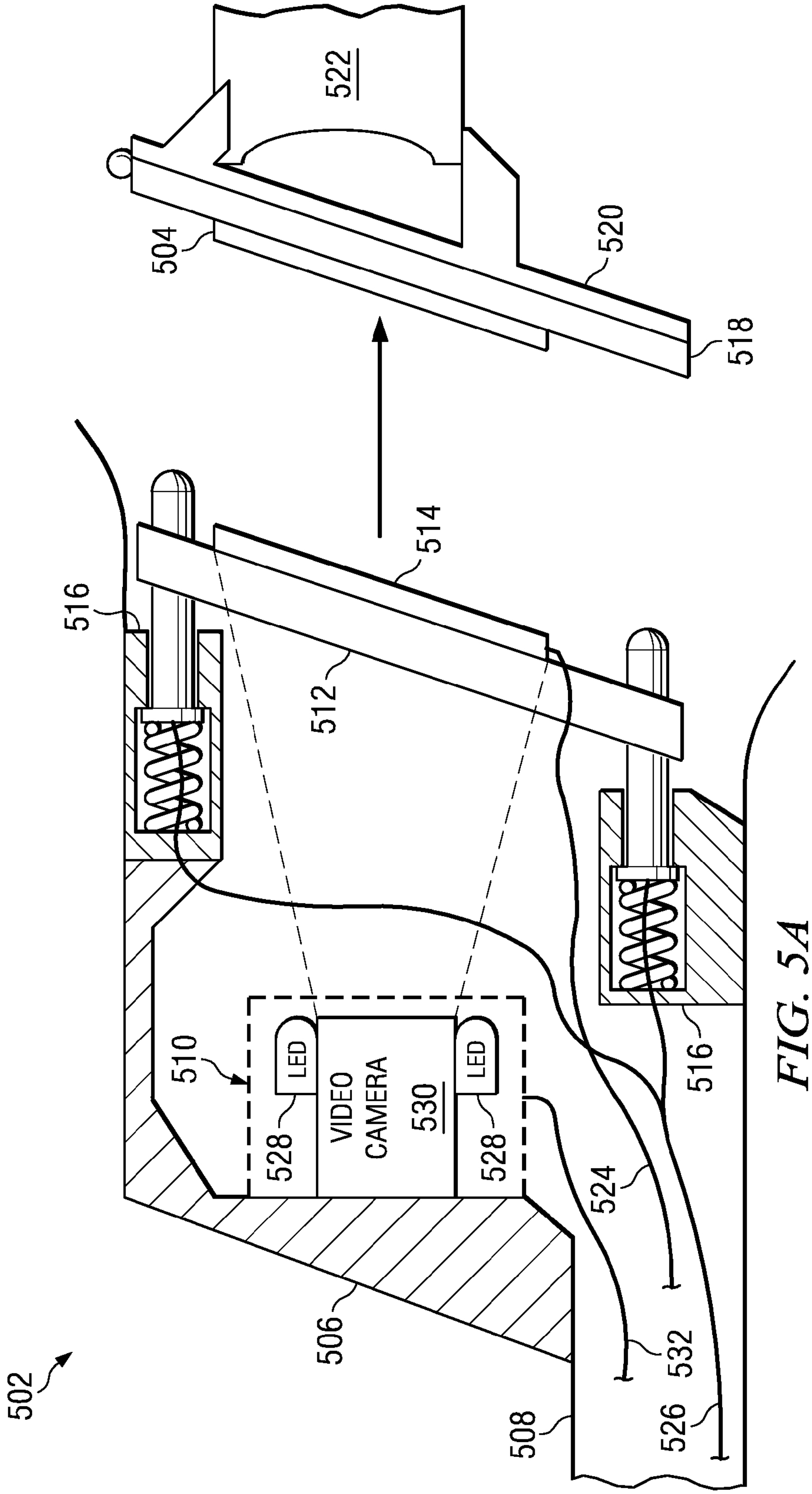
FIG. 5A illustrates the mechanisms utilized to stamp a piece of ePaper in conjunction with video/image confirmation and video alignment in accordance with an illustrative embodiment.

FIG. 5A illustrates the mechanisms utilized to stamp a piece of ePaper in conjunction with video/image confirmation and video alignment in accordance with an illustrative embodiment. The mechanisms required to stamp a piece of ePaper are stamping mechanism 502, ePaper label 504, and conductive backing plate 518. Conductive backing plate 518 is typically metal but may be any other type of conductive material. ePaper label 504 may be a piece of ePaper, such as ePaper 302 of FIG. 3. Stamping mechanism 502 comprises support structure 506, handle 508, and video system 510. Video system 510 may be a digital camera. Video system 510 contains lenses necessary to obtain a focused image of ePaper label 504 when stamping mechanism 502 is applied to ePaper label 504. Handle 508 may be hand-held or mounted on a robot arm or other mechanism. Support structure 506 provides support to flexibly mounted transparent support 512 and transparent grid 514. Flexibly mounted transparent support 512 may be spring loaded as shown or use some other type of flexible mounting mechanism.

Flexibly mounted transparent support 512 provides flexibility to transparent grid 514 when transparent grid 514 is pressed against ePaper label 504, and spring loaded grounding pins 516 are pressed against conductive backing plate 518. Flexibly mounted transparent support 512 also allows video system 510 to view ePaper label 504 during the stamping process. Transparent grid 514 is comprised of a thin film of mini-transistors which supplies the voltage or charge necessary to rotate the beads in ePaper label 504 to present one colored side for the beads in ePaper label 504. Transparent grid 514 may be similar to such grids used in liquid crystal displays. Stamping mechanism 502 uses spring loaded grounding pins 516 to complete the circuit necessary with conductive backing plate 518 to write ePaper label 504.

ePaper label 504 may be affixed to conductive backing plate 518. Conductive backing plate 518 may further be affixed to non-conductive ePaper mount 520, and non-conductive ePaper mount 520 may be further affixed to shelf 522, which may be a shelf in a retail store. Conductor 524 provides signals to the thin film of mini-transistors on transparent grid 514. The signals may be from a processing unit, such as processing unit 206 of FIG. 2. Conductor 526 provides a grounding path to spring loaded grounding pins 516.

Video system 510 provides a viewing of ePaper label 504 prior to, during, and after the stamping process. Video system 510 uses light emitting devices (LED) 528 to provide the necessary light so that video camera 530 may view ePaper label 504. Video camera 530 may be a digital camera. Images captured by video camera 530 are sent to a graphics processor, such as graphics processor 210 of FIG. 2, over conductor 532.

Figure 5B:
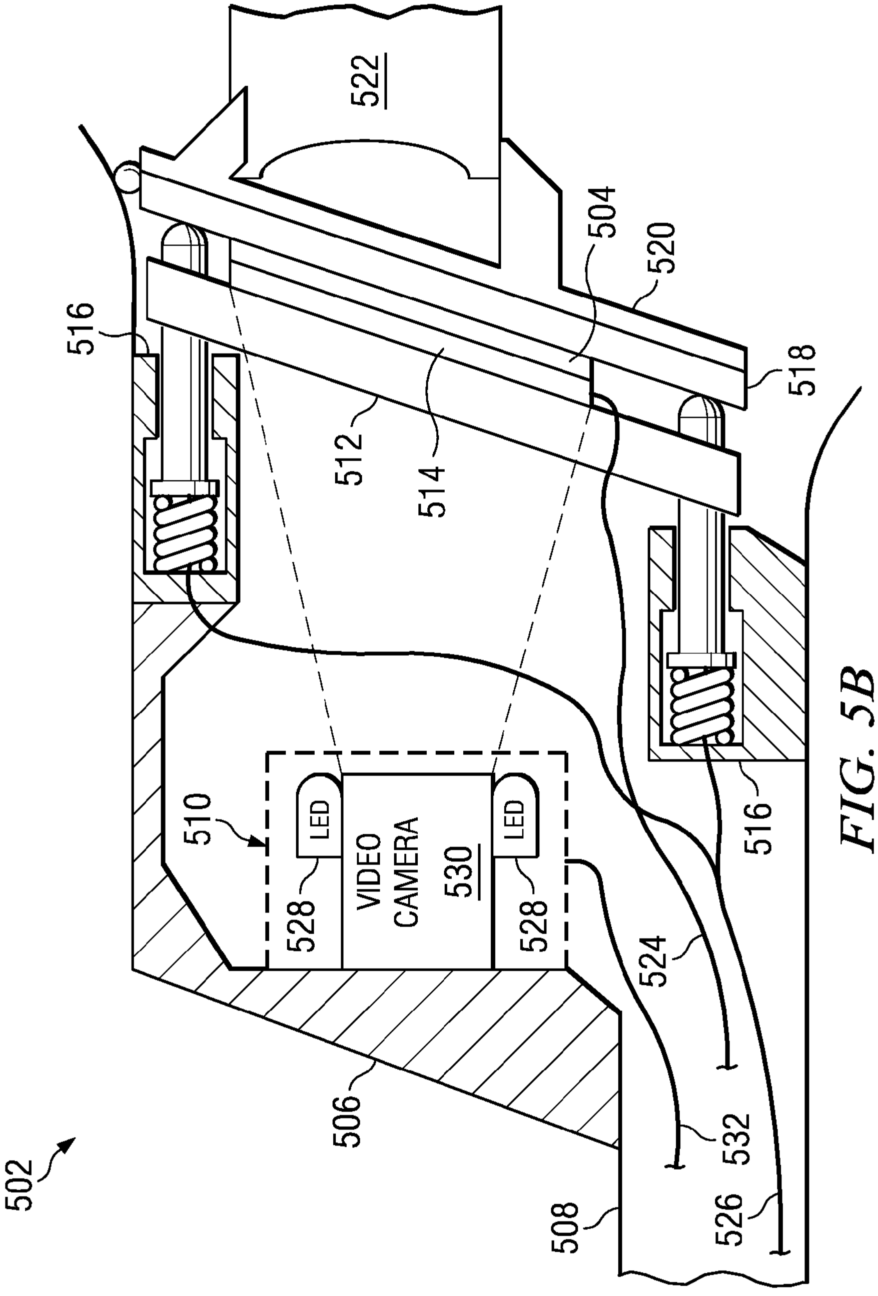
FIG. 5B illustrates the stamping of a piece of ePaper in conjunction with video/image confirmation and video alignment in accordance with an illustrative embodiment.

FIG. 5B illustrates the stamping of a piece of ePaper in conjunction with video/image confirmation and video alignment in accordance with an illustrative embodiment. Stamping mechanism 502 is shown to be in contact with ePaper label 504. More specifically, grid 514 is within a selected distance of ePaper label 504, and spring loaded grounding pins 516 are in contact with conductive backing plate 518. At this point, signals received by grid 514 from conductor 524 are transmitted to ePaper label 504 which causes beads within ePaper label 504 to rotate to present one colored side. The signals may be from a processing unit, such as processing unit 206 of FIG. 2. The electric field circuit is completed through ePaper label 504 to conductive backing plate 518. Conductive backing plate 518 is grounded through spring loaded grounding pins 516, and the circuit completes through conductor 526.

Video system 510 provides a viewing of ePaper label 504 prior to, during, and after the stamping process. Video system 510 uses light emitting devices (LED) 528 to provide the necessary light so that video camera 530 may view ePaper label 504. Video camera 530 may be a digital camera. Images captured by video camera 530 are sent to a graphics processor, such as graphics processor 210 of FIG. 2, over conductor 532. Video camera 530 may process an image into a standard image format, such as a JPEG file, and transmit the file directly to a processing unit, such as processing unit 206 of FIG. 2. Conductor 532 may be one or more conductors necessary to provide video data and control, lighting, etc. The graphics processor may process the images and send appropriate information to a processing unit, such as processing unit 206 of FIG. 2, and/or display the images on a display unit, such as video display terminal 104 of FIG. 1.

The images are used by the processing unit to signal alignment of stamping mechanism 502 so that ePaper label 504 may be stamped correctly. The alignment of stamping mechanism 502 may be through viewing the alignment on a display unit and manually moving stamping mechanism 502 or signals sent to a robot so that a robot arm may move to align stamping mechanism 502. The images may also be used by the processing unit to check whether the existing image on ePaper label 504 needs updating and to determine whether the image just written by stamping mechanism 502 was successfully written. Existing image processing methods may be used for this.

Figure 6:
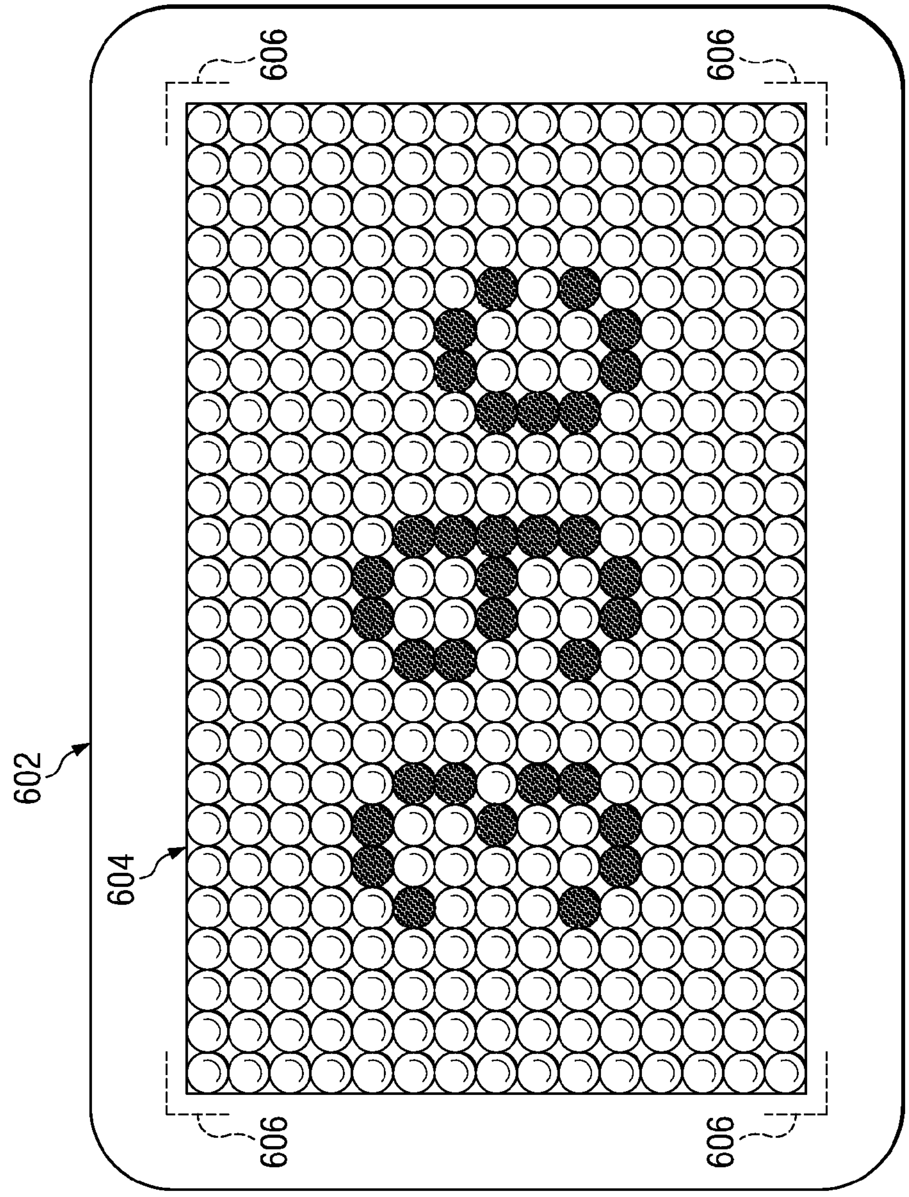
FIG. 6 illustrates an exemplary view of a piece of ePaper from a video system in accordance with an illustrative embodiment.

FIG. 6 illustrates an exemplary view of a piece of ePaper from a video system in accordance with an illustrative embodiment. Video camera view 602 is a view of ePaper 604 as may be seen through the lens of a video camera, such as video camera 530 of FIG. 5B.

A stamping mechanism may be aligned with ePaper 604 in various ways. Alignment marks or alignment corners 606 may be printed near ePaper 604 as shown in FIG. 6. An image from the video camera containing alignment corners 606 enables the stamping mechanism to be centered, both vertically and horizontally, relative to ePaper 604 so that ePaper 604 may be stamped correctly using a stamping mechanism in which the video camera is installed. Other types of marks, such as text, bar codes, lines, dots, etc. near ePaper 604 may be used to enable alignment. A contrast in appearance between ePaper 604 and the conductive backing may also be used. The stamping mechanism may be moved manually, robotically, or via other automated method to achieve said centering. Alternatively, ePaper 604 may be moved relative to the stamping mechanism.

Another method of alignment may use visual characteristics of the conductive backing plate or the shelf the ePaper is mounted on or other elements in the environment near the ePaper.

Another method of alignment may use a unique pattern of special electrical contacts and holes on/in the metal backing may be used in conjunction with special contactors on the stamping mechanism to enable alignment.

Another method of alignment may use a mechanical alignment mechanism that enables the ePaper mount to move into alignment with the stamping mechanism when the stamping mechanism contacts the mount while being slightly out of alignment. Self aligning mechanical connections are not new and are not claimed herein.

Figure 7:
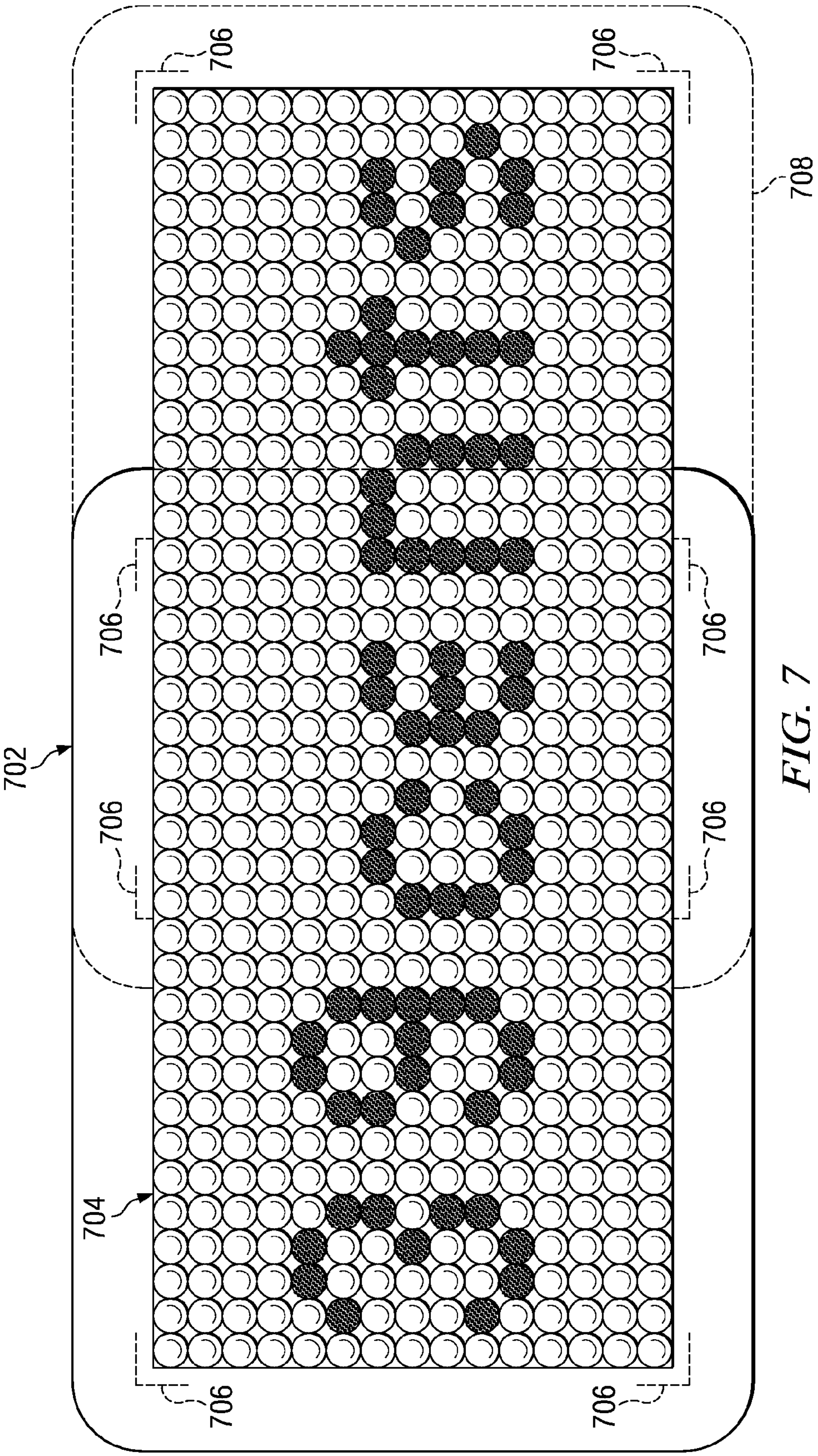
FIG. 7 illustrates an exemplary composite view of a larger piece of ePaper from a video system in accordance with an illustrative embodiment.

FIG. 7 illustrates an exemplary composite view of a larger piece of ePaper from a video system in accordance with an illustrative embodiment. The composite view is made up of multiple images, video camera view 702 and video camera view 708, each image being part of the larger ePaper. As shown in the example, ePaper 704 is larger than the stamping mechanism is capable of viewing and stamping in one stamping. In this example, the video camera is used to attempt to align the stamping mechanism relative to ePaper 704, using alignment corners 706. Thus, the video camera uses alignment corners 706 to align the stamping mechanism vertically and identify the left edge of ePaper 704. Once these alignments have been made, the stamping mechanism makes an initial stamp of ePaper 704. In order to complete the stamp, the stamping mechanism moves to the right and then uses alignment corners 706 to vertically align ePaper 704 and identify the right edge of ePaper 704 as shown in video camera view 708. Once these alignments have been made, the stamping mechanism makes a second stamp of ePaper 704.

Although not shown in FIG. 7, if ePaper 704 requires multiple stamps, the stamping mechanism may align as shown above but may also stamp a line (or an unused pattern of light/dark bead orientations) at the rightmost edge of the initial stamp and use the stamped line to align the next stamp. Then, the next stamp would remove the line created in the initial stamp and place another line for alignment of any subsequent stamps.

The invention can take the form of an entirely hardware embodiment or an embodiment containing both hardware and software elements.

Furthermore, parts of this invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus comprising:

a support structure;

a handle connected to the support structure, wherein the handle is used to manipulate the support structure;

a grid connected to the support structure, wherein the grid has circuitry to cause changes in an appearance of a piece of ePaper; and a grounding pin electrically connected to the grid, wherein the grid supplies a voltage to change the appearance of the piece of ePaper when the grid comes within a selected distance of a first side of the piece of ePaper such that, when the grounding pin contacts a conductive backing plate located on a second side of the piece of ePaper, a voltage path is completed from the grid through the piece of ePaper to the conductive backing plate to form a stamped image.

2. The apparatus of claim 1, further comprising:

a flexible backing, wherein the flexible backing connects the grid to the support structure and provides flexibility to the grid when the grid is pressed against the piece of ePaper.

3. The apparatus of claim 1, further comprising:

a spring loaded backing, wherein the spring loaded backing connects the grid to the support structure and provides flexibility to the grid when the grid is pressed against the piece of ePaper.

4. The apparatus of claim 3, wherein the spring loaded backing is a transparent spring loaded backing and wherein the grid is a transparent grid.

5. The apparatus of claim 4, wherein the transparent grid and the transparent spring loaded backing are mounted at an angle such that light from a set of light emitting devices is not reflected off the transparent grid or the transparent spring loaded backing into an imaging system.

6. The apparatus of claim 1, wherein the grid is comprised of mini-transistors that supply the voltage to change the appearance of the piece of ePaper.

7. The apparatus of claim 1, wherein the grid is composed of a plurality of points and wherein each of the plurality of points is individually controllable so the appearance of the piece of ePaper changes.

8. The apparatus of claim 1, further comprising:

an imaging system, wherein the imaging system is comprised of a set of light emitting devices and a video camera, wherein the set of light emitting devices provide necessary lighting for the video camera to view the piece of ePaper.

9. The apparatus of claim 8, wherein the video camera captures images of the piece of ePaper to form captured images.

10. The apparatus of claim 9, wherein the captured images are used to align a stamping mechanism so that the piece of ePaper may be stamped correctly.

11. The apparatus of claim 9, wherein the captured images are used to determine whether an existing image on the piece of ePaper needs updating.

12. The apparatus of claim 9, wherein the images are used to determine whether a stamped image is successfully written.

13. A method for stamping a piece of ePaper, the method comprising:

positioning a grid within a selected distance to a first side of the piece of ePaper;

conductively connecting a grounding pin to a conductive backing plate located on a second side of the piece of ePaper, wherein a voltage path is completed from the grid through the piece of ePaper to the conductive backing plate;

supplying a voltage to the grid, wherein supplying the voltage to the grid changes an appearance of the piece of ePaper to form a stamped image; and capturing images of the first side of the piece of ePaper using an imaging system to form captured images; and aligning the grid with the first side of the piece of ePaper using the captured images so that the piece of ePaper may be stamped correctly.

14. The method of claim 13, further comprising:

determining whether an existing image on the piece of ePaper needs updating using the captured images.

15. The method of claim 13, further comprising:

determining whether the stamped image was successfully written using the captured images.

* * * * *